United States Patent [19]
DeVolpi

[11] Patent Number: 6,067,005
[45] Date of Patent: May 23, 2000

[54] MULTI-SPEED MULTI-DIRECTION ANALOG POINTING DEVICE

[76] Inventor: Dean R. DeVolpi, 774 Mays Blvd. #10-424, Incline Village, Nev. 89451

[21] Appl. No.: 09/307,581

[22] Filed: May 7, 1999

Related U.S. Application Data

[63] Continuation-in-part of application No. 09/096,301, May 31, 1998, Pat. No. 5,912,612.
[60] Provisional application No. 60/061,825, Oct. 14, 1997.
[51] Int. Cl.[7] .................................................. H01C 10/10
[52] U.S. Cl. ............................ 338/47; 338/95; 200/512; 200/513
[58] Field of Search ................................ 338/95, 99, 96, 338/97, 114, 47; 200/512, 513, 516, 1 B

[56] References Cited

U.S. PATENT DOCUMENTS

| | | |
|---|---|---|
| 4,002,873 | 1/1977 | Lewandowski ..................... 200/314 |
| 4,257,305 | 3/1981 | Friend et al. ........................ 84/1.24 |
| 5,455,556 | 10/1995 | Ohm et al. .......................... 338/114 |
| 5,489,900 | 2/1996 | Cali et al. ........................... 341/34 |
| 5,550,339 | 8/1996 | Haugh ................................ 200/5 A |

*Primary Examiner*—Lincoln Donovan
*Assistant Examiner*—Richard K. Lee
*Attorney, Agent, or Firm*—Quinn & Quinn, P.C.; William J. Quinn; Cornelius P. Quinn

[57] ABSTRACT

A compact, low-cost pad pointing device with improved performance, reliability and durability, having an integrated selection switch, that can be used as a cursor pointing device and selection mechanism for computers, remote controls, web TV, TV guide browsers, video games, consumer electronics, industrial controllers, medical, automotive and other applications. A contact surface can be deflected to positions on an electrical medium that results in the generation of speed and direction signals while a selection switch may be simultaneously activated through the same control element.

70 Claims, 8 Drawing Sheets

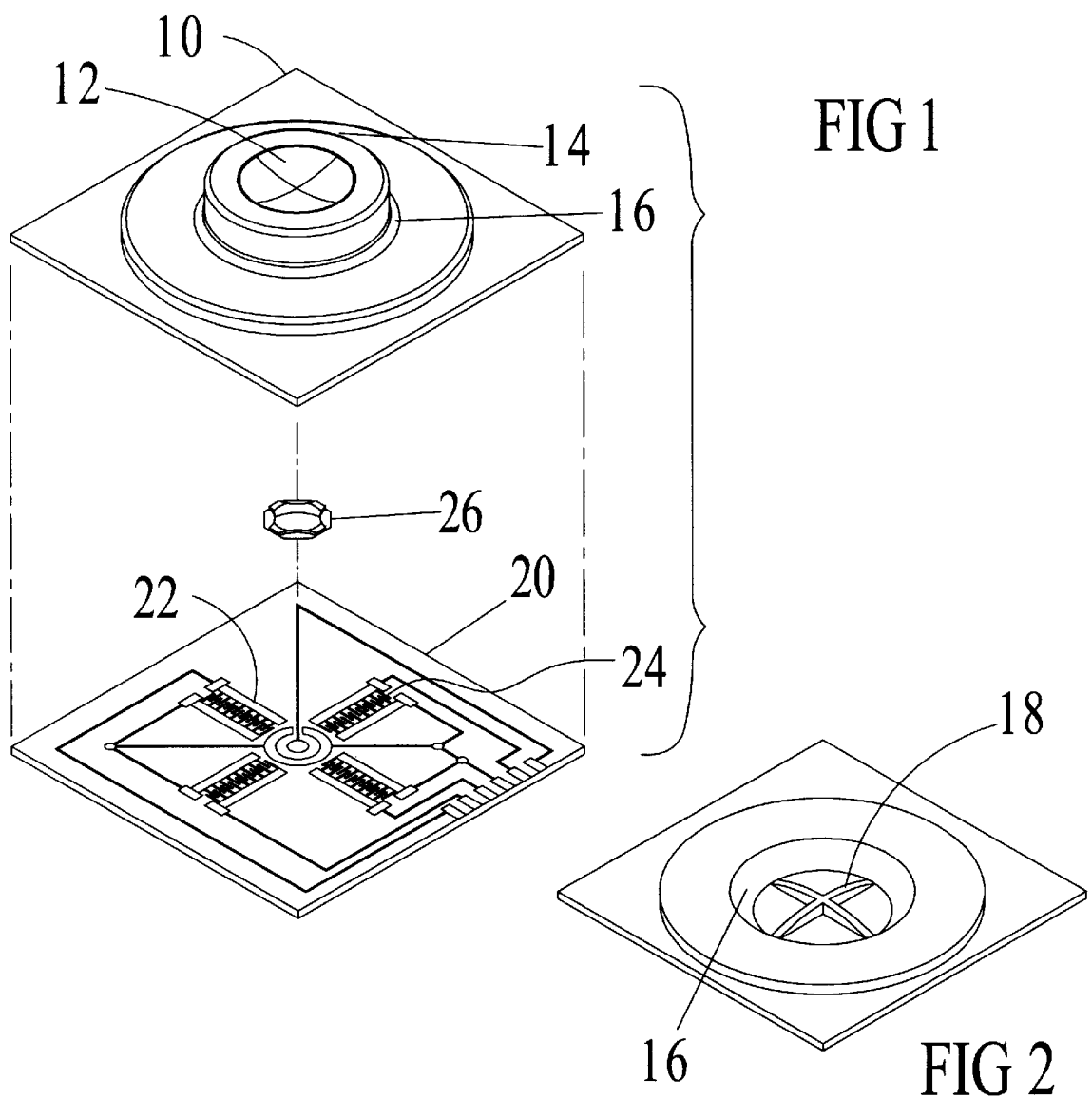
FIG 1
FIG 2
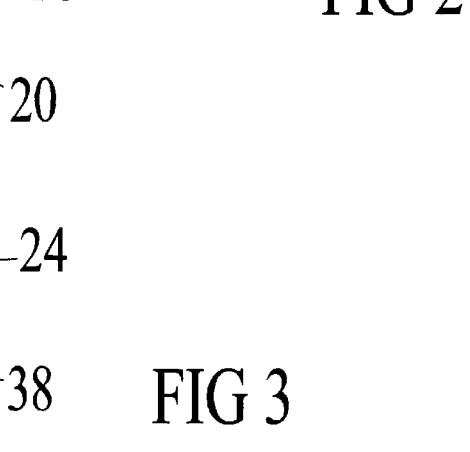
FIG 3

6,067,005

MULTI-SPEED MULTI-DIRECTION ANALOG POINTING DEVICE

CROSS REFERENCE TO RELATED APPLICATION

This application claims the benefit of and is a Continuation in Part of application Ser. No. 09/096,301 entitled Multi-Speed Multi-Direction Analog Pointing Device and filed on May 31, 1998, now U.S. Pat. No. 5,912,612 which claims the benefit of U.S. provisional patent application Ser. No. 60/061,825 filed on Oct. 14, 1997 and entitled Resistive Pointing Technology.

FIELD OF THE INVENTION

The present invention relates in general to multi-speed multi-direction pointing devices, and more specifically, to improvements in a multi-speed multi-direction analog pad pointing device with integrated selection means.

BACKGROUND OF THE INVENTION

In the known art pointing devices are utilized in connection with computers, video game controls, hand held remote controls, web TV controls, consumer electronic controls, industrial controllers, medical equipment, automotive equipment and other similar applications. With such pointing devices, the user is allowed to readily control the speed and directional input and make selections within a particular application. It is the objective of such pointing devices to provide an inexpensive, compact, precise and effortless means of control in an application and minimize fatigue and the amount of interrupted action required of the operator. The pointing devices of the known art have not been able to effectively fulfill these objectives without concessions, as is illustrated with regard to the representative devices of the known art described hereafter.

In U.S. Pat. No. 4,864,272 to Cecchi et al, a joystick controller utilizing a sliding contact on resistive and conductive regions that are parallel to one another and perpendicular to the center of the axis of movement is disclosed. The drawback to this method of creating an output that may be interpreted into speed and direction, is that operational contact results in abrasion of the resistive and conductive regions as well as requiring many components to accomplish the variable resistive output.

In U.S. Pat. No. 5,498,843 to Date et al, a pivoting digital only pointing device that makes contact in the direction of a direct axis is disclosed. Date teaches the use of a single speed and eight directions. Date does not teach the use of resistive regions for variable speeds and increased variability of direction. The resultant drawback being that the Date device is limited in variability of speed and direction.

In U.S. Pat. No. 4,896,003 to Hsieh, a pivoting pad, digital only, pointing device that makes contact in the direction of a direct axis is disclosed. Hsieh also teaches the use of parallel conductive digital traces that extend perpendicularly from the center. The resultant drawback being that the Hsieh device is limited in its number of digital contacts due to congestion; thus, it is impractical to provide a device having a greatly variable number of speeds and directions.

In U.S. Pat. No. 5,488,206 to Wu, the use of conductive rubber and membrane switches in a digital fashion to supply speed and directional output is disclosed. The Wu device is therefore limited to providing a small number of speeds.

In U.S. Pat. No. 5,376,913 to Pine et al, the use of a solid conductive curved disc and that a single resistor can be contacted to affect a change in resistance is disclose. The drawback to the Pine device being that, Pine does not anticipate the use of multiple resistors for pointing or the use of just a segment of the conductive disc to minimize costs.

In U.S. Pat. No. 5,675,309 to DeVolpi the use of a continuous curved disc that pivots on a substrate that has resistive and conductive elements completely covering or surrounding the center of a printed circuit board in a continuous 360 degree area is disclosed. The drawbacks to the DeVolpi device being that directions other than the true axis are hard to control for infinite controlled proportional resolution due to the footprint of the conductive rubber disc; and truly consistent varied angles cannot be achieved. Further, the solid conductive curved disc is the most expensive component of the disclosed technology.

In U.S. Pat. No. 5,278,557 to Stokes et al, a force-sensitive variable resistor that operates using triangulation is disclosed. The drawback to this method of providing a speed and direction output is that a polymer force-sensitive material is utilized, and the inherent properties of such a material result in having to apply excessive force to get an increased speed output, which in extended use can cause fatigue in the user.

Further, in the known pointing devices, such as joysticks, trackballs, computer mice and the like, the integration of selection means with the input element utilized to control speed and directional vectors, is a limiting factor in the miniaturization of the pointing device. In typical joysticks where size in application is not a concern, a means to make a selection is often provided by the placement of one or more switch buttons upon the handle of the joystick. As the size of the joystick is miniaturized, such as with the placement of the joystick within a computer keyboard, or where the handle is removed, switches placed upon the handle are no longer feasible so that to provide a selection means, an additional input element for making selections, separated from speed and directional input element is necessary, resulting in additional effort and fatigue in the operator.

Accordingly, it is the object of the present invention to provide an improved multi speed multi direction analog pad pointing device incorporating selection means without the concessions made in known art, which can be easily assembled in a minimum number of manufacturing steps, and which is not dependent on precise manufacturing tolerances to achieve accurate and fine resolution in use, thereby lending itself to mass production and assembly with consistent quality at a cost comparable to a conventional pointing device. It is a further object of the present invention to incorporate a means for selecting an action and means to ensure positive contact and prevent slippage so that accurate speed and directional control can be maintained and actions can be selected through the same control element, thereby reducing the number of interrupted actions required in operation while allowing fine resolution and variability of speed and directional output to be obtained.

SUMMARY OF THE INVENTION

The objects of the present invention are attained by a multi-speed multi-direction pad pointing device which uses a top cover, which on its bottom, has an elastic protruding segment which is either electrically conductive or resistive on its bottom surface and has continuous surface or a number of ribs which radiate out from its center at various angles. The top cover is formed free floating or with an elastic return ridge that encircles the protruding segment and may be caused to bend and flex when in operation. A substrate such as a printed circuit board, glass, paper, ceramic or plastic which has conductive lines and resistive coatings formed on it or embedded within it, homogeneous throughout or likewise provided on the surface is positioned below the protruding segment of the top cover. The top cover may also be formed with or incorporate, one or more protrusions, located at or surrounding the center of the protruding segment, which ensure that the protruding segment of the top cover does not make electrical contact with the conductive lines or resistive coatings of the substrate when no external force is applied, thereby reducing the precision of manufacturing tolerances necessary, and allowing the use of a top cover that might otherwise cause unwanted electrical contact in its static position. Force is applied in operation to deform the return ridge and cause the protruding segment to move downward and tilt in orientation so that contact is made with the conductive lines or resistive tracts of the substrate in a location and of dimension corresponding to the direction and degree of the force applied such that an output signal is provided that may be translated by analog to digital or RC timing circuitry into speed and direction vectors. In the case where the top cover incorporates short prevention protrusions, the protrusions may be caused to compress or deform upon application of external force, thereby allowing electrical contact between the protruding segment and the conductive lines and resistive coatings of the substrate. Alternatively, if the short prevention protrusions are formed of rigid material, the top cover under external force can be made to deform, allowing electrical contact between the protruding segment and the conductive lines and resistive coatings of the substrate. As the protruding segment is elastic, once contact is made between the protruding segment and the substrate, additional downward force may be utilized to deform the protruding segment and provide fine resolution control. The elastic nature of the return ridge causes the protruding segment to return to its unbiased position when external force is removed in operation. Additionally, in the event that the top cover is formed with one or more short prevention protrusions, the elastic nature of the protrusions and the top cover surrounding the protrusion when deformed in operation store additional potential energy which is used to return the protruding segment to its unbiased position when external force is removed.

Although a typical joystick handle may be attached to the top cover in the present invention, it is preferred in the present invention that the top cover be formed to contain a dimple on its upper surface to accommodate the tip of the operator's finger; therefore, no element projecting out from the top cover is necessary for operation, as is necessary with a typical joystick. The upper surface of the top cover within the dimple may be formed or treated to increase friction between the operator's fingertip and the dimple's surface thereby reducing slippage and facilitating fine resolution control. This increased friction of the dimple's surface is desirable as the top cover is formed of elastic material, such as silicone, which can become slippery. The increased friction of the dimple's surface can be increased by applying higher friction material to the surface of the dimple. Alternatively, the increased friction may be obtained by forming the dimple with a coarse surface, or series of steps which are able engage the circular patterned ridges of an operator's finger tip and thereby eliminate the necessity of an additional procedure to obtain the desired increase in friction.

To provide the means for selecting an action in the present invention, a dome type switch is located between the center of the protruding segment of the top cover and the substrate, which is activated upon application of sufficient downward external force through the dimple of the top cover. The position of the dome switch can be maintained by attached it to the substrate or the center of the segment by adhesive or mechanical means. Alternatively, the position of the dome switch can be maintained in the absence of its attachment to the substrate or segment by providing dome switch retaining protrusions thereby eliminating an assembly procedure to attach the dome switch. The dome switch retaining protrusions are disbursed immediately around the dome switch and contact, or are continuous with, the lower surface of the top cover and the upper surface of the substrate such that lateral movement of the dome switch is prevented.

The objects of the present invention are also attained by an alternative embodiment of the present invention, which utilizes a top cover, which on its bottom, has an elastic protruding segment which has a continuous surface or a number of ribs which radiate out from its center at various angles. The top cover is formed free floating or with an elastic return ridge that encircles the protruding segment and may be caused to bend and flex when in operation. A membrane switch is placed below the protruding segment and has resistive and conductive surfaces facing each other with dielectrics to prevent the resistive and conductive surfaces from making contact in the unbiased position. Force is applied in operation to deform the return ridge and cause the segment to move downward and tilt in orientation so that contact is made with the membrane causing contact to be made between conductive and resistive surfaces in a location corresponding to the direction and degree of the force applied such that an output signal is provided that may be translated by analog to digital or RC timing circuitry into speed and direction vectors. As the protruding segment is elastic, once contact is made between the segment and the membrane switch, additional downward force may be utilized to deform the segment, thereby varying the contact made between the conductive and resistive regions of the membrane switch and provide fine resolution control. Finally, as the return ridge is elastic, the segment returns to its unbiased position when force is removed in operation.

It can be observed from the present invention, that by utilizing an elastic return ridge to control the contact position of the protruding segment with the substrate, and also to return the present invention to its unbiased position, the amount of force required of the operator is minimized, resulting in increased control and decreased fatigue for the operator over extended periods of continued use. And the addition of one or more short prevention protrusions allows the necessary tolerances in manufacturing of the top cover to be reduced, allowing otherwise substandard top covers to be utilized, while maintaining accuracy of speed and directional output with a minimal increase of force in operation. Further, as the present invention may utilize continuous resistive tracts or surfaces, the number of speeds and directions is limited only by the analog to digital circuitry employed. Further, as the protruding segment may be sectioned into a number of ribs radiating from its center or, in the alternate embodiment, a membrane switch is utilized, the amount of conductive rubber is reduced or eliminated, reducing the cost accordingly. Still further, as a dome switch is provided beneath the protruding segment, a selection means is provided which may be activated through the same control element utilized to control the speed and directional output signals. Additionally, the small number of component parts will allow the present invention to be mass-produced at a consistent quality and uniformity at no additional manufacturing cost to a conventional remote control.

Other objects, advantages and novel features of the present invention will become apparent from the following drawings and detailed description of the preferred embodiments.

BRIEF DESCRIPTION OF THE DRAWINGS

FIG. 1 is an exploded perspective view of the present invention displaying the cover with a dimple, dome switch and substrate.

FIG. 2 is a perspective view of the bottom of the cover shown in FIG. 1 displaying the protruding segment.

FIG. 3 is a plan view of the substrate shown in FIG. 1 displaying the resistive and conductive paths thereon.

DETAILED DESCRIPTION OF THE PREFERRED EMBODIMENTS

Figure 4:
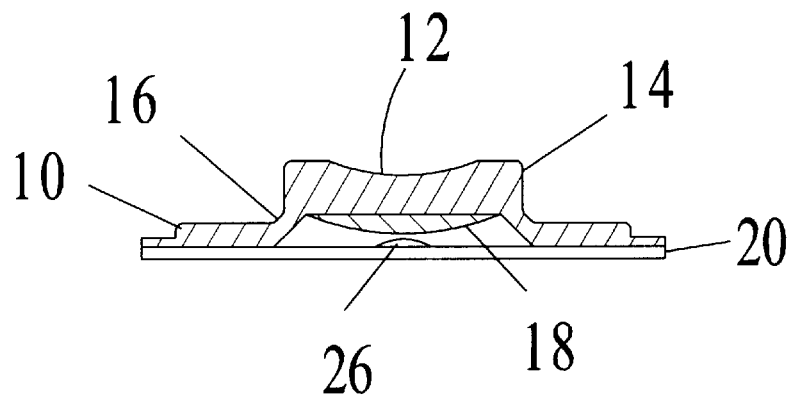
FIG. 4 is sectional view of the present invention shown in FIG. 1.

The present invention will now be described with reference to FIGS. 1 through 4.

The pad pointing device of the present invention shown in FIGS. 1 through 4 comprises a cover 10, which on its top surface has a dimple 12 formed within the top of the pad 14, wherein a finger may be placed within dimple 12 of pad 14 to apply compression and tilting forces in operation of the pad pointing device. Cover 10 is formed with a return ridge 16 surrounding pad 14, which may be caused to bend and flex when external force is applied to pad 14 through dimple 12, and which causes pad 14 to return to an unbiased position when such external force is removed from pad 14. Further, cover 10 has a protruding segment 18 formed on or attached to its bottom surface directly below dimple 12 and encircled within return ridge 16; protruding segment 18 is shaped with a number of ribs which radiate out from its center at various angles and is preferably formed of an elastic material that may be deformed when a force is applied. The lower surface of protruding segment 18 is electrically conductive or resistive. The pad pointing device further comprises a substrate 20 which has resistive regions 22 and conductive regions 24 formed on or within its upper surface. The conductive regions 24 are electrically connected to resistive regions 22 and are arranged in an alternating ladder fashion of contacts radiating out from the center of substrate 20 at various angles. The substrate 20 is positioned with its upper surface facing the bottom surface of cover 10 in such orientation that the conductive regions 24 are directly below the ribs of protruding segment 18. A dome switch 26 is secured to the center of the upper surface of substrate 20 and provides a means to select an action by application of downward force to pad 14, which is transmitted through protruding segment 18 to dome switch 26 which provides an electrical switch signal through substrate 20.

In operation of the present invention as shown in FIGS. 1 through 4, when an external force is applied by an operators finger in dimple 12 tangent to the focal point of dimple 12 of pad 14, the force is transmitted through pad 14 of cover 10 deforming return ridge 16 thereby causing a rocking and downward movement of protruding segment 18 resulting in the lower surface of protruding segment 18 making physical contact with substrate 20 and shorting at least one conductive region 24 contact with an opposing conductive region 24 contact thereby creating a signal of measurable resistance. As the external force applied is varied in force or direction, the location of the contact made on the conductive regions 24 correspondingly changes resulting in a corresponding change in measurable resistance which may be translated by analog to digital or RC timing circuitry into speed and direction vectors. Additionally, variation in the degree of downward external force applied can be utilized for refined resolution as the protruding segment 18 may be made of elastic type material. When the external force is removed, the potential energy stored in return ridge 16 from the application of the force is utilized to return pad 14, and thus protruding segment 18 to the unbiased position wherein no contact is made between protruding segment 18 and conductive regions 24. When sufficient downward force is applied through dimple 12 and transmitted through protruding segment 18 compressing dome switch 26, the contacts within dome switch 26 close and provide an electrical signal, with the same effect as when a button on a computer mouse is depressed; this electrical signal from dome switch 26 is transmitted through substrate 20.

Figure 5:
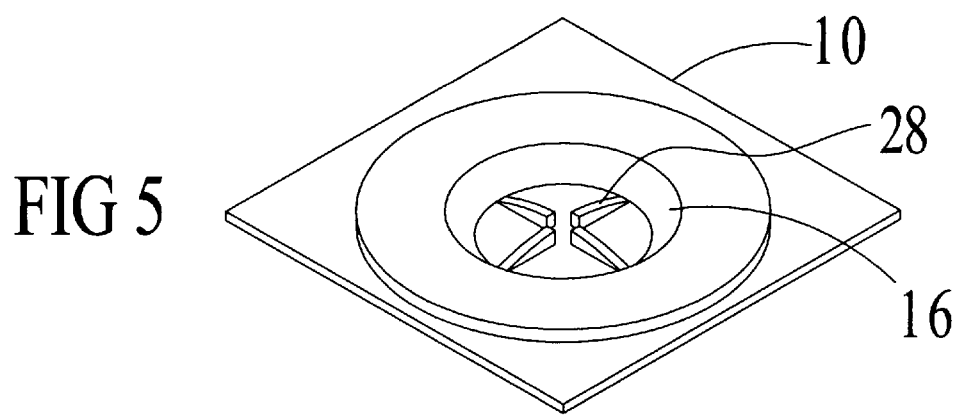
FIG. 5 is a perspective view of the bottom of the cover displaying a modified non-continuous form of the protruding segment.

In FIG. 5 a modified form of the cover 10 is illustrated with a non-continuous protruding segment 28 with a recess provided in the center of the non-continuous protruding segment which would allow dome switch 26 to be recessed.

Figure 6:
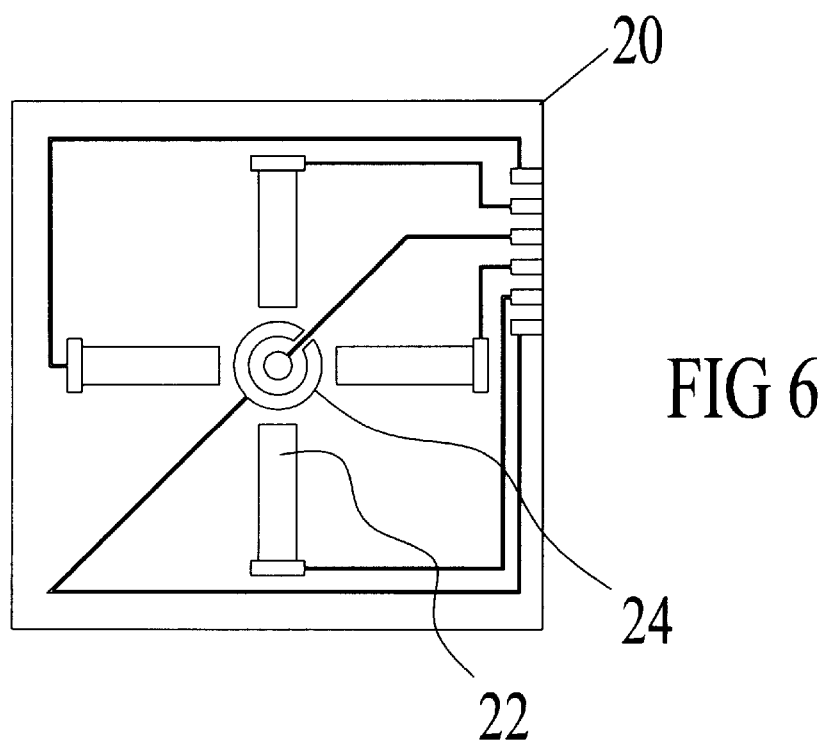
FIG. 6. is a plan view of the substrate with a modified layout of the resistive and conductive paths thereon.

FIG. 6 illustrates a modified form of the substrate 20 with continuous resistive regions 22 arranged directly below the ribs of protruding segment 18 and where a potential voltage is applied to the lower surface of protruding segment 18 through the surface of dome switch 26, which is electrically conductive in this embodiment of the invention. The potential voltage is provided to the surface of dome switch 26 by its contact with conductive region 24. In operation, when an external force is applied in dimple 12 tangent to the focal point of dimple 12 of pad 14, the force is transmitted through pad 14 of cover 10 deforming return ridge 16 and thereby causing a rocking and downward movement of protruding segment 18 resulting in the lower surface of protruding segment 18 making physical and electrical contact with at least one resistive region 22 of substrate 20. And since a potential voltage is applied to the lower surface of protruding segment 18, a signal of measurable resistance which may be translated into speed and directional vectors is therefore provided. The signal of measurable resistance is varied according to the amount and direction of the force applied which corresponds to the location and size of the area of contact between the lower surface of protruding segment 18 and resistive regions 22.

Figure 7:
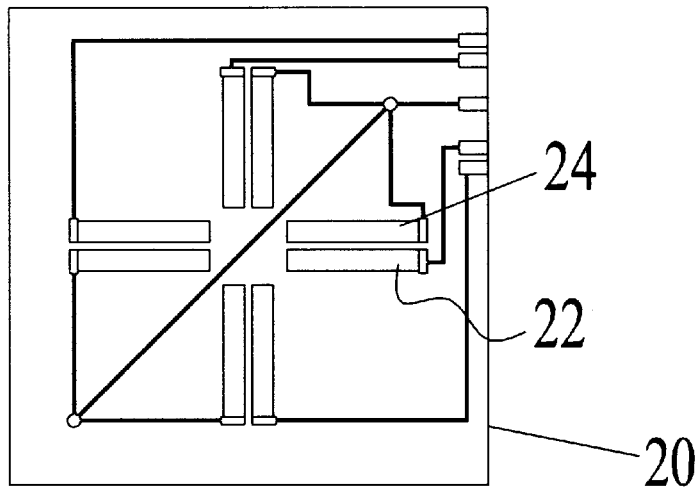
FIG. 7 is a plan view of the substrate with a modified layout of the resistive and conductive paths thereon.

FIG. 7 illustrates a modified form of the substrate 20 with resistive regions 22 and conductive regions 24 arranged adjacent to each other, with each pair of resistive region 22 and conductive region 24 arranged directly below the ribs of protruding segment 18. In operation, when an external force is applied in dimple 12 tangent to the focal point of dimple 12 of pad 14, the force is transmitted through pad 14 of cover 10 deforming return ridge 16 and thereby causes a rocking and downward movement of protruding segment 18 resulting in the lower surface of protruding segment 18 making physical contact with substrate 20 and thereby shorting together at least one pair of resistive region 22 and conductive region 24 at a location corresponding to the amount and direction of the force applied. Consequently, a signal of measurable resistance is established, which corresponds to the location and size of the area of resistive regions 22 and conductive regions 24 that are shorted together by the lower surface of protruding segment 18, which may be translated into speed and directional vectors.

An alternate embodiment of the present invention will now be described with reference to FIGS. 8 through 10.

Figure 8:
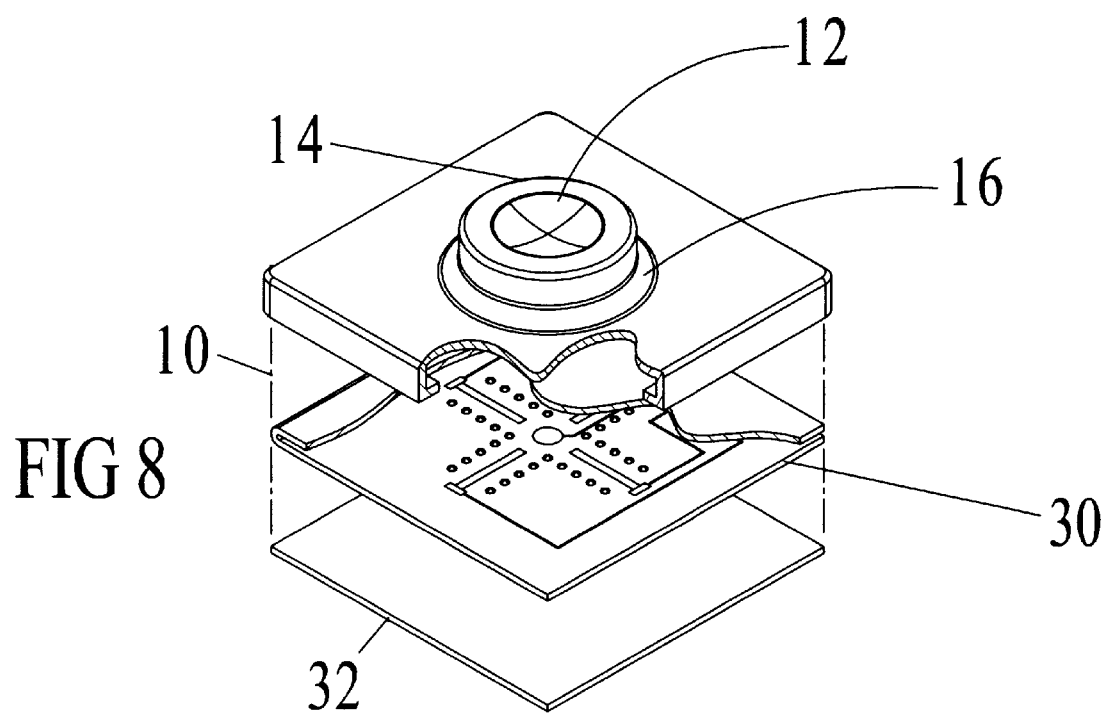
FIG. 8 is an exploded perspective view of a modified form of the present invention utilizing a membrane switch as the substrate.
Figure 9:
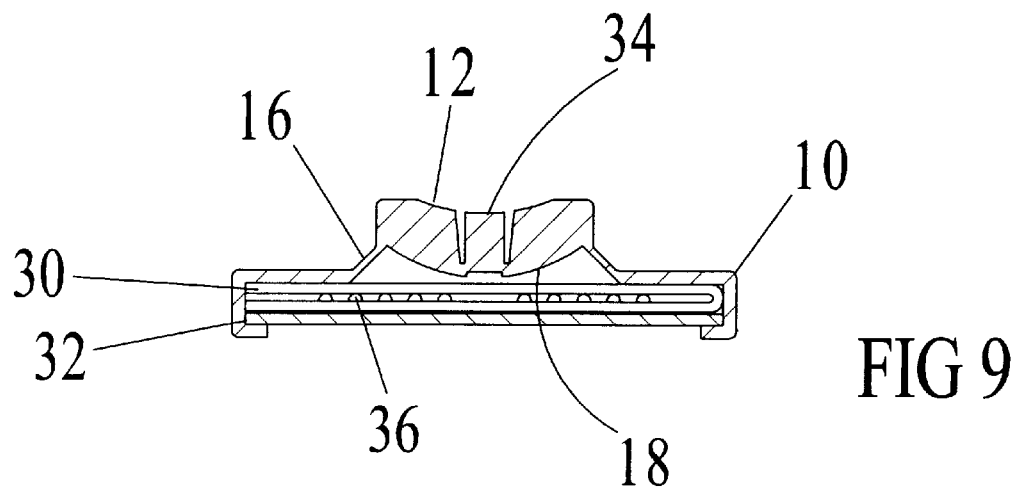
FIG. 9 is a sectional view of the present invention shown in FIG. 8 with a modified form of the cover incorporating a built in switch button.
Figure 10:
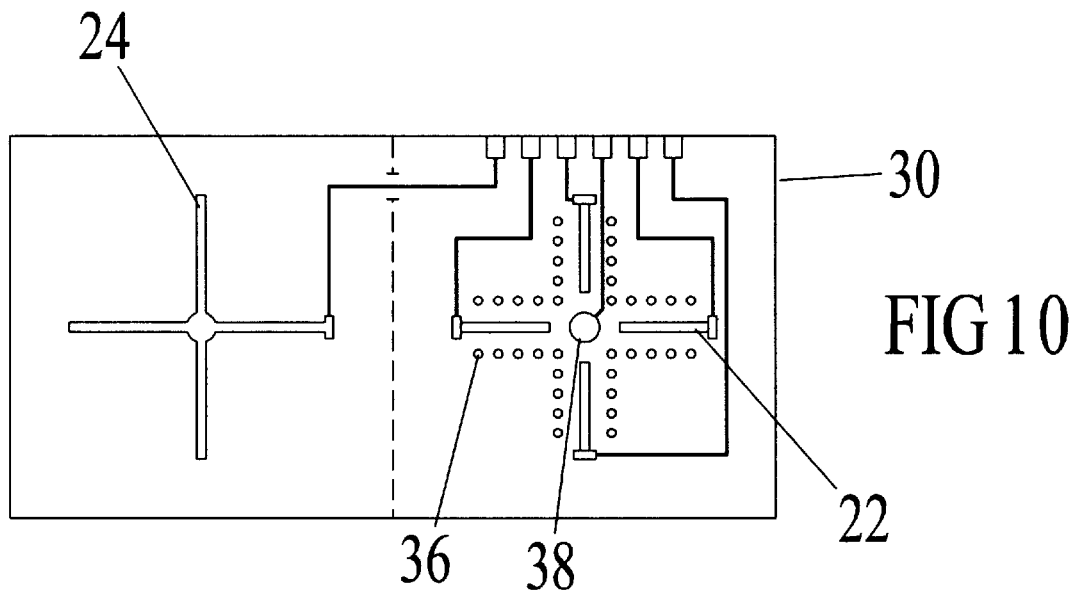
FIG. 10 is a plan view of the membrane switch and the resistive and conductive paths and dielectrics thereon.

An alternate embodiment of the pad pointing device of the present invention shown In FIGS. 8 through 10 comprises a cover 10, which on its top surface has a dimple 12 formed within the top of the pad 14, wherein a finger may be placed within dimple 12 of pad 14 to apply compression and tilting forces in operation of the pad pointing device. An integrated button is also provided within dimple 12 of pad 14. Cover 10 is formed with a return ridge 16 surrounding pad 14, which may be caused to bend and flex when external force is applied to pad 14 through dimple 12, and which causes pad 14 to return to an unbiased position when such external force is removed from pad 14. Further, cover 10 has a protruding segment 18 formed on or attached to its bottom surface directly below dimple 12 and encircled within return ridge 16; protruding segment 18 is shaped with a number of ribs which radiate out from its center at various angles and is preferably formed of an elastic material that may be deformed when a force is applied. The pad pointing device further comprises a membrane switch 30 which has resistive regions 22 and conductive regions 24 formed on or within is top surface. The resistive regions 22 and the conductive regions 24 are arranged on membrane switch 30 in such orientation that when assembled they are situated directly below the ribs of protruding segment 18. In assembled fashion, the membrane switch 30 is folded over upon itself so that resistive regions 22 are aligned with and are facing conductive regions 24 and a rigid backer surface 32 is placed under membrane switch 30. Dielectrics 36 are provided for on the surface of membrane switch 30 to prevent the membrane switch 30 surfaces from making contact in the unbiased position. A digital wake-up switch contact 38 is also provided in the center of the resistive regions 22.

In operation of the alternate embodiment of the present invention as shown if FIGS. 8 through 10, when an external force is applied by an operators finger in dimple 12 the force is transmitted through pad 14 of cover 10 deforming return ridge 16 thereby causing a rocking and downward movement of protruding segment 18 resulting in the lower surface of protruding segment 18 making physical contact with the outside surface of the membrane switch 30 which is supported by rigid backer surface 32. The physical contact that is made by the protruding segment 18 presses the two layers of the membrane switch 30 together, which shorts at least one of the conductive regions 24 with its opposing resistive region 22 at a position corresponding to the direction of the force applied. The shorting of the conductive region 24 with its opposing resistive region 22, completes a circuit causing a variable resistance. The greater the force applied in a given direction the further out from the center of substrate 20 the short occurs, corresponding to a measurable change in resistance. To effect refined movement, varying force may be utilized in a perpendicular compressive fashion to the membrane switch 30. The output resistance is interpreted by analog to digital or RC timing circuitry into speed and direction vectors. When the external force is removed, the potential energy stored in return ridge 16 from the application of the force is utilized to return pad 14, and thus protruding segment 18 to the unbiased position wherein no contact is made between protruding segment 18 and membrane switch 30.

Figure 11:
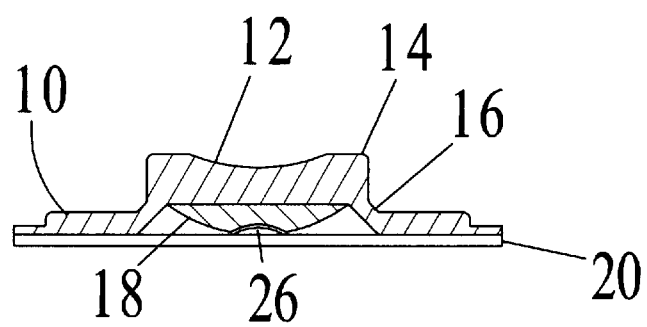
FIG. 11 is a sectional view of the present invention displaying a modified form of the protruding segment which is recessed to accommodate the dome switch.

In FIG. 11 a modified form of the cover 10 is illustrated with a continuous protruding segment 18 with a recess provided in the center of the continuous protruding segment which would allow dome switch 26 to be recessed.

Figure 12:
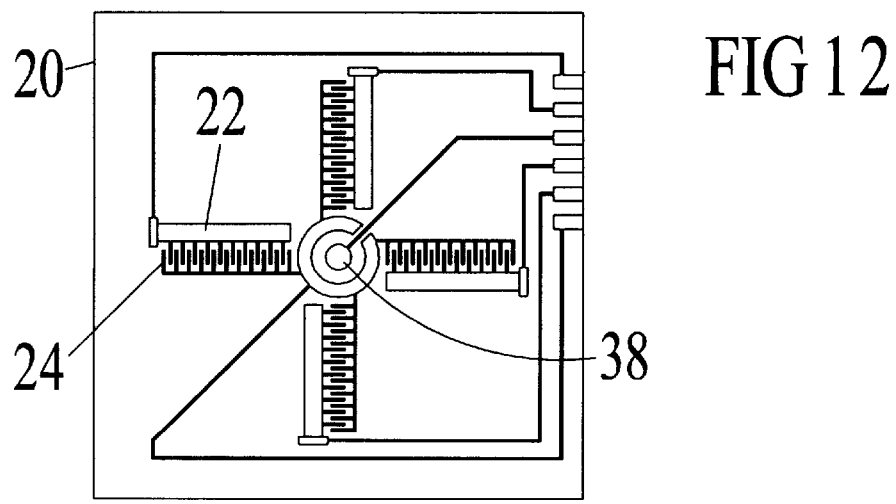
FIG. 12 is a plan view of the substrate with a modified layout of the resistive and conductive paths thereon.

FIG. 12 illustrates a modified form of the substrate 20 which has a digital wake-up switch contact 38 at its center and has resistive regions 22 and conductive regions 24 formed on or within is upper surface. The conductive regions 24 are arranged in an alternating ladder fashion of contacts radiating out from the center of substrate 20 at various angles. Each alternating contact in a conductive region 24 is electrically connected to a resistive region 22 at a location corresponding to its distance from the center of substrate 20 In use, the substrate 20 is to be positioned with its upper surface facing the bottom surface of cover 10 in such orientation that the conductive regions 24 are directly below the ribs of protruding segment 18.

Figure 13:
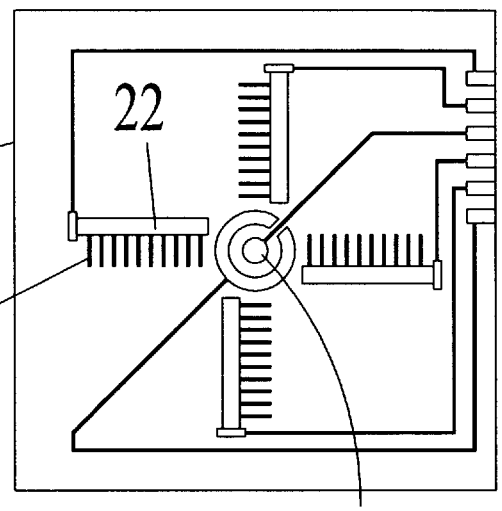
FIG. 13 is a plan view of the substrate with a modified layout of the resistive and conductive paths thereon.

FIG. 13 illustrates a modified form of the substrate 20 which has a digital wake-up switch contact 38 at its center and has resistive regions 22 and conductive regions 24 formed on or within is upper surface. The conductive regions 24 are arranged in a ladder fashion of contacts radiating out from the center of substrate 20 at various angles. Each contact in a conductive region 24 is electrically connected to a resistive region 22 at a location corresponding to its distance from the center of substrate 20. The conductive regions 24 are arranged directly below the ribs of protruding segment 18. A potential voltage is applied to the lower surface of protruding segment 18. In operation, when an external force is applied in dimple 12 tangent to the focal point of dimple 12 of pad 14, the force is transmitted through pad 14 of cover 10 deforming return ridge 16 and thereby causes a rocking and downward movement of protruding segment 18, resulting in the lower surface of protruding segment 18 making physical and electrical contact with at least one of the conductive regions 24 of substrate 20. And as a potential voltage is applied to the lower surface of protruding segment 18, a signal of measurable resistance which may be translated into speed and directional vectors is therefore provided corresponding to the amount and direction of the force applied.

Figure 14:
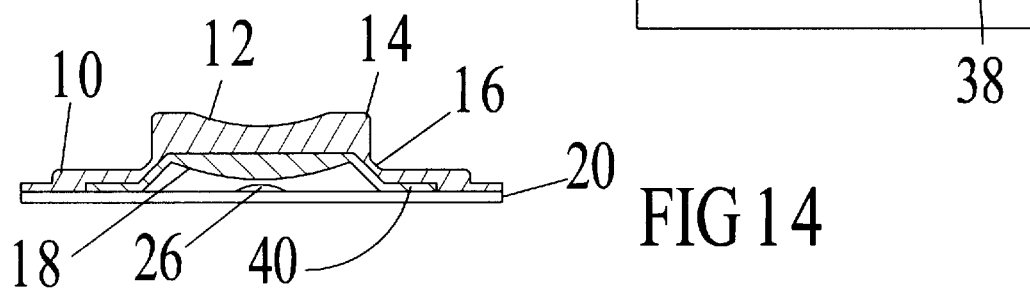
FIG. 14 is a sectional view of the present invention displaying a modified form of the cover having conductive legs extending from the protruding segment and electrically contacting the substrate.
Figure 15:
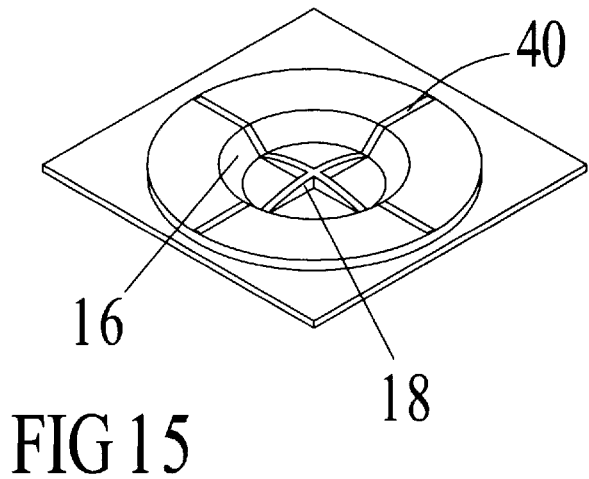
FIG. 15 is a perspective view of the bottom of the cover shown if FIG. 14 displaying the conductive legs extending from the protruding segment.
Figure 16:
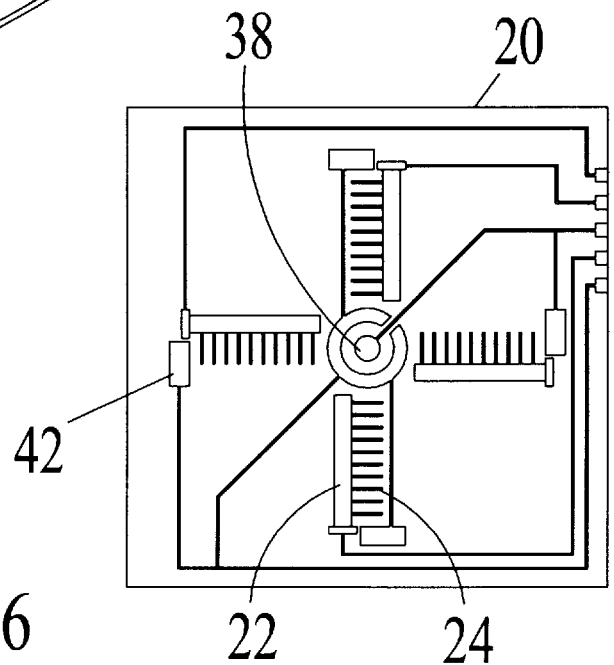
FIG. 16 is a plan view of the substrate with a modified layout of the resistive and conductive paths thereon which incorporate contacts for the conductive legs of the cover shown if FIG. 15.

FIGS. 14 through 16 illustrate a modified form of the present invention. In this modified for of the present invention cover 10, on its top surface has a dimple 12 formed within the top of the pad 14, wherein a finger may be placed within dimple 12 of pad 14 to apply compression and tilting forces in operation of the pad pointing device. Cover 10 is formed with a return ridge 16 surrounding pad 14, which may be caused to bend and flex when external force is applied to pad 14 through dimple 12, and which causes pad 14 to return to an unbiased position when such external force is removed from pad 14. Further, cover 10 has a protruding segment 18 formed on or attached to its bottom surface directly below dimple 12 and encircled within return ridge 16; protruding segment 18 is shaped with a number of ribs which radiate out from its center at various angles and is preferably formed of an elastic material that may be deformed when a force is applied. The lower surface of protruding segment 18 is electrically conductive or resistive. A conductive leg 40, formed on or within cover 10, and in electrical contact with the lower surface of protruding segment 18, extends outward and beyond the return ridge 16 toward the periphery of cover 10 from each rib of protruding segment 18. Additionally, in this modified version of the present invention the substrate 20 has a digital wake-up switch contact 38 at its center and has resistive regions 22 and conductive regions 24 and leg contact points 42 formed on or within is upper surface. The conductive regions 24 are arranged in a ladder fashion of contacts radiating out from the center of substrate 20 at various angles. Each leg contact point 42 is positioned such that when the substrate 20 is fitted below the cover 10 conductive legs 40 are in electrical contact with leg contact points 42. Each contact in a conductive region 24 is electrically connected to a resistive region 22 at a location corresponding to its distance from the center of substrate 20. The conductive regions 24 are arranged directly below the ribs of protruding segment 18.

In operation of the modified form of the present invention as illustrated in FIGS. 14 through 16, a potential voltage is applied to the lower surface of protruding segment 18 by electrical contact through conductive legs 40 which are in electrical contact with leg contact points 42. Therefore, application of a potential voltage to protruding segment 18 does not require that the surface of dome switch 26 be electrically conductive or that a central contact be otherwise provided. When an external force is applied in dimple 12 tangent to the focal point of dimple 12 of pad 14, the force is transmitted through pad 14 of cover 10 deforming return ridge 16 and thereby causes a rocking and downward movement of protruding segment 18 resulting in the lower surface of protruding segment 18 making physical and electrical contact with at least one of the conductive regions 24 of substrate 20. As a potential voltage has been applied to the lower surface of protruding segment 18, a signal of measurable resistance which may be translated into speed and directional vectors is therefore provided corresponding to the amount and direction of the force applied.

Figure 17:
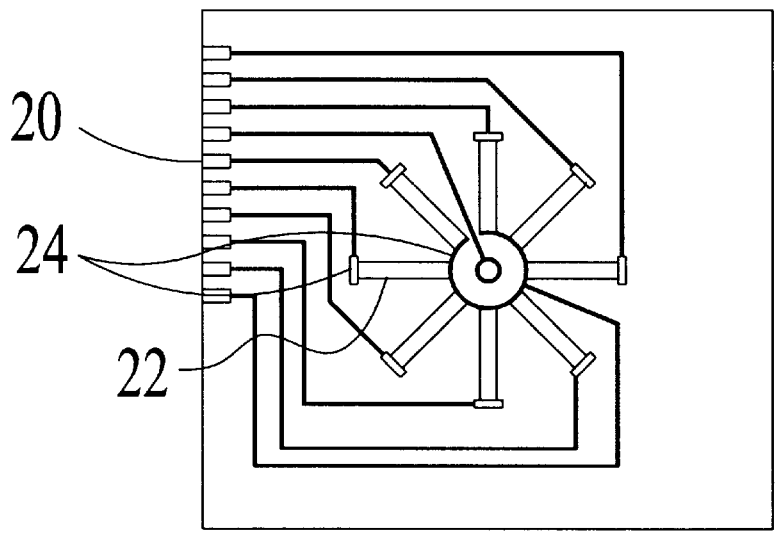
FIG. 17 is a plan view of the substrate that is utilized in a modified form of the invention wherein the protruding segment is formed with eight ribs; the corresponding substrate with eight resistive paths is illustrated in this view.
Figure 18:
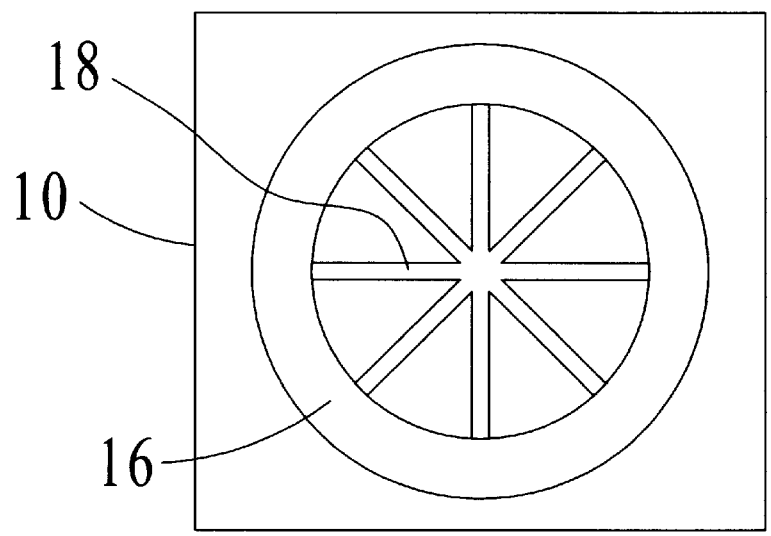
FIG. 18 is a perspective view of the bottom of the cover in a modified form of the invention, which is utilized in connection with the substrate illustrated in FIG. 17, and displays the protruding segment having eight ribs.

FIGS. 17 and 18 illustrate an alternate configuration of the resistive regions 22 and conductive regions 24 of substrate 20 and the corresponding ribs of protruding segment 18 of cover 10. This configuration illustrates the use of conductive and resistive tracts of the substrate 20 and protruding segment at more than four various angles from the center.

Figure 19:
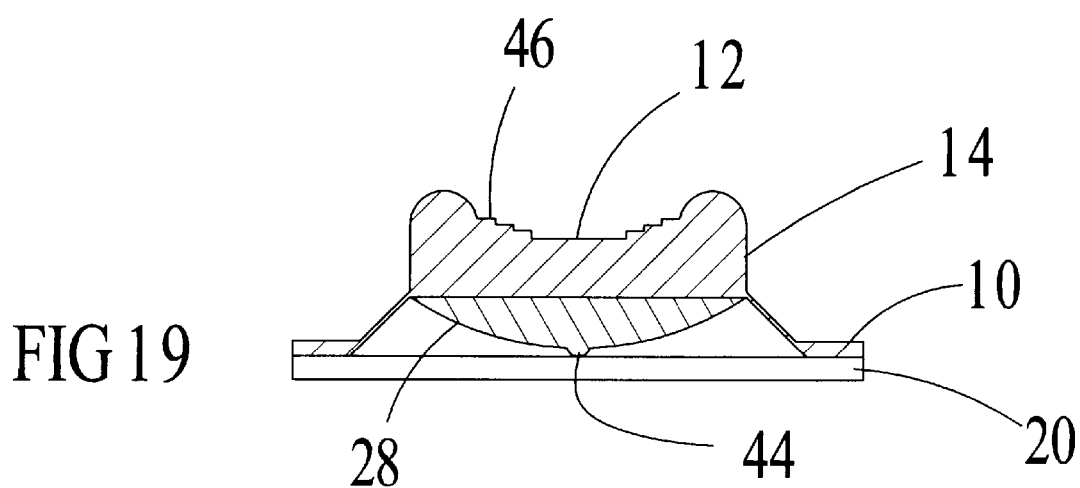
FIG. 19 is a sectional view of the present invention illustrating a short prevention protrusion formed in the center of the protruding segment and illustrating the dimple with a series of steps formed on its surface to engage the fingerprint ridges of an operator.

FIG. 19 illustrates the present invention incorporating enhancements to cover 10. In this enhanced form of the invention, a short prevention protrusion 44 is located at the center of, and upon the surface of, protruding segment 28 of cover 10. In operation of this embodiment of the invention, short prevention protrusion 44 serves as a dielectric interposed between protruding segment 28 and substrate 20 which prevents physical and electrical contact between the surface of protruding segment 28 and the resistive regions 22 or conductive regions 24, of substrate 20 in the absence of external force. Upon application of external force within dimple 12 of pad 14, short prevention protrusion 44 is compressed and deformed between protruding segment 28 and substrate 20 thereby allowing rocking and downward movement of segment 28 so that the lower surface of protruding segment 18 can make physical and electrical contact with at least one of the conductive regions 24 or resistive regions 22 of substrate 20.

Where a top cover 10 incorporating one or more short protection protrusions 44, as illustrated in FIG. 19, is used in connection with a dome switch 26, the dome switch 26 or short protection protrusions 44, or both are offset to prevent the inadvertent activation of dome switch 26. Alternatively, by utilizing a dome switch 26 which requires application of a force greater than that required to compress and deform short protrusions 44 and allow contact between protruding segment 18 and substrate 20, the inadvertent activation of the dome switch may be prevented without the necessity of offsetting the dome switch 26, or the one or more short prevention protrusions 44.

An additional enhancement to cover 10, as illustrated in FIG. 19 is the formation of a series of fingertip engagement steps 46 which are formed within the dimple 12 of pad 14 of cover 10. The fingertip engagement steps 46 are formed within dimple 12 to engage the fingerprint ridges present on an operator's fingertip, and may be formed as a series of concentric steps or similar coarse surface pattern. Alternatively, the engagement steps 46 can be comprised of the application of a coating or insert of high frictional material to the surface of dimple 12. As the cover 10, is formed of elastic material, such as silicone, which has a propensity to become slippery, the formation of engagement steps 46 or other comparable friction increasing treatment within dimple 12 results in a decreased in slippage and force required in operation of the invention.

Figure 20:
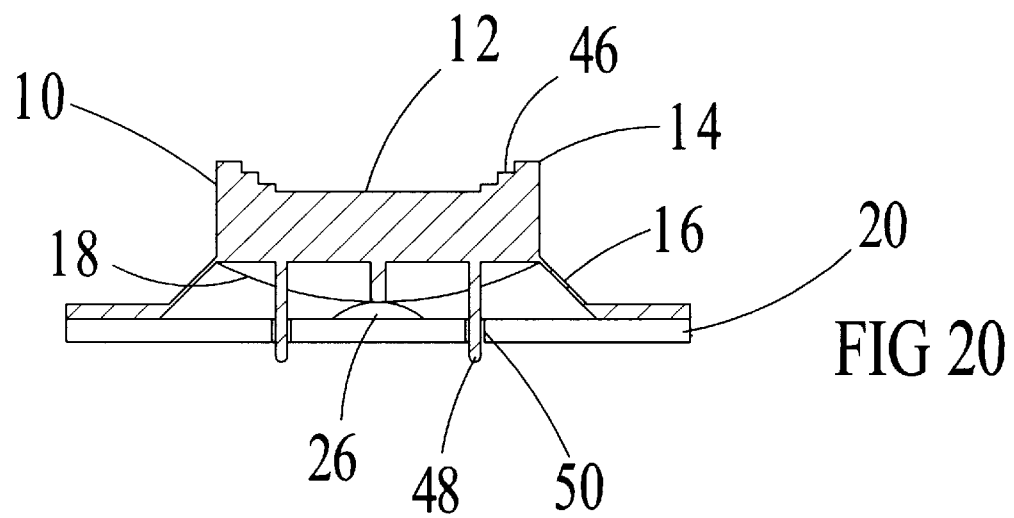
FIG. 20 is a sectional view of the present invention in assembled form and illustrating the dome switch and the dome switch retaining protrusions.
Figure 21:
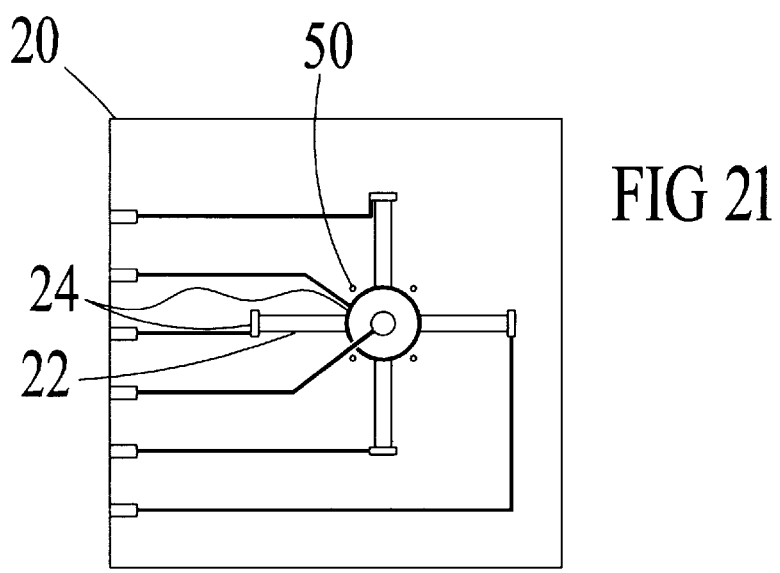
FIG. 21 is a plan view of the substrate of the present invention displaying retaining holes through which dome switch retaining protrusions can be secured.
Figure 22:
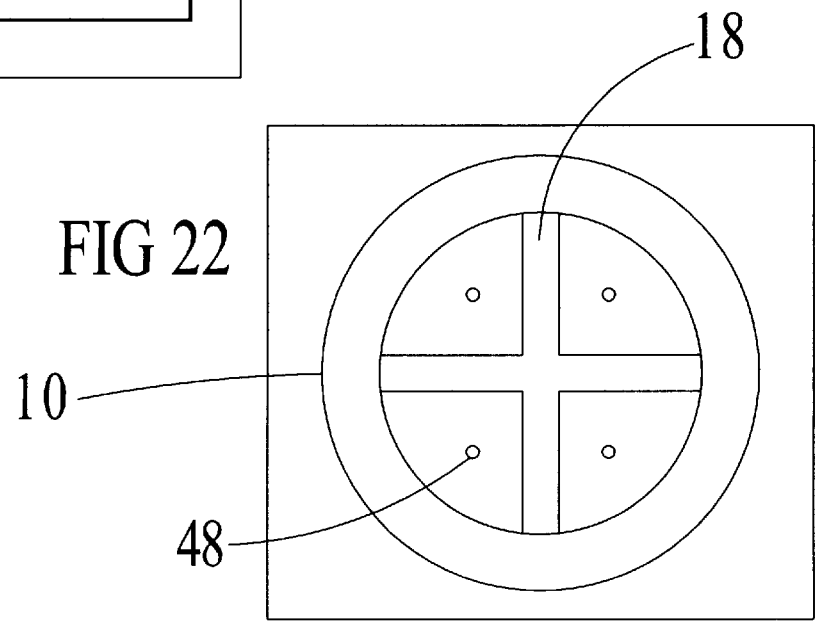
FIG. 22 is a perspective view of the bottom of the cover displaying the dome switch retaining protrusions and the protruding segment.

FIGS. 20 through 22 illustrate yet another enhancement to the present invention wherein a dome switch 26 can be incorporated into the invention without the necessity of attaching the dome switch 26 to the protruding segment 18 of top cover 10 or to the substrate 20. In this enhancement of the present invention, as illustrated in FIGS. 20 through 22, a number of dome switch retaining protrusions 48 extend downward from the bottom surface of cover 10. The substrate 20 is fashioned with number of dome switch retaining protrusion apertures 50 corresponding in position to the dome switch retaining protrusions 48 of cover 10 such that in assembled form, each dome switch retaining protrusion 48 engages a corresponding dome switch retaining protrusion aperture 50. The dome switch retaining protrusions 48 are disbursed immediately around the periphery of dome switch 26, thereby confining dome switch 26 between the lower surface of cover 10 and the upper surface of substrate 20 within the axis formed on the line between the center of the protruding segment 18 and the center of substrate 20.

Additionally, each retaining protrusion 48 may be formed of elastic material and have a shoulder or stop that can engage the upper surface of substrate 20 at the periphery of the retaining protrusion aperture 50 and thereby limit the depth of engagement of the dome switch retaining protrusions 48 through the retaining protrusion apertures 50. Where the depth of engagement of the dome switch retaining protrusions 48 through the retaining protrusion apertures 50 is limited, the dome switch retaining protrusions 48 prevent physical and electrical contact between the surface of protruding segment 28 and the resistive regions 22 or conductive regions 24, of substrate 20 in the absence of external force, thereby providing the same short prevention function as the short protection protrusions 44, illustrated in FIG. 19.

Figure 23:
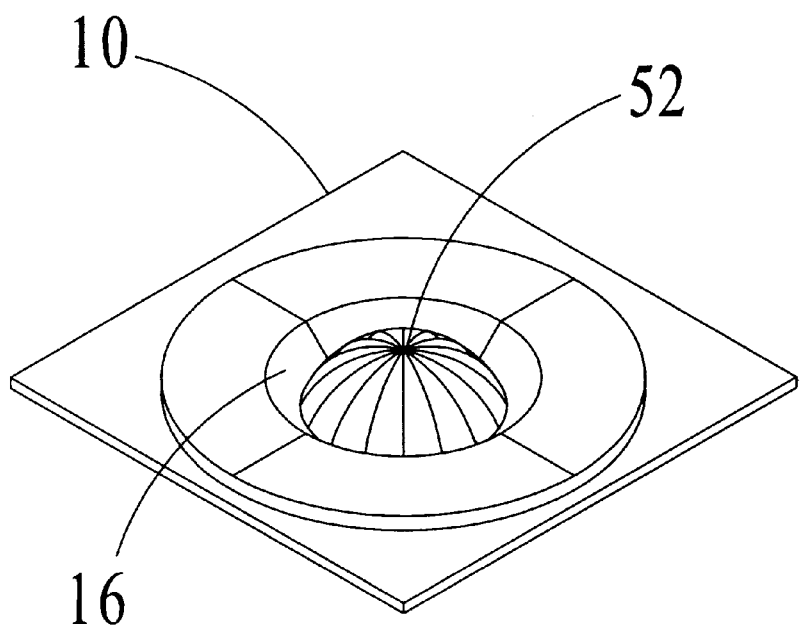
FIG. 23 is a perspective view of the bottom of the cover of a modified form of the present invention illustrating a continuous bottom surface.
Figure 24:
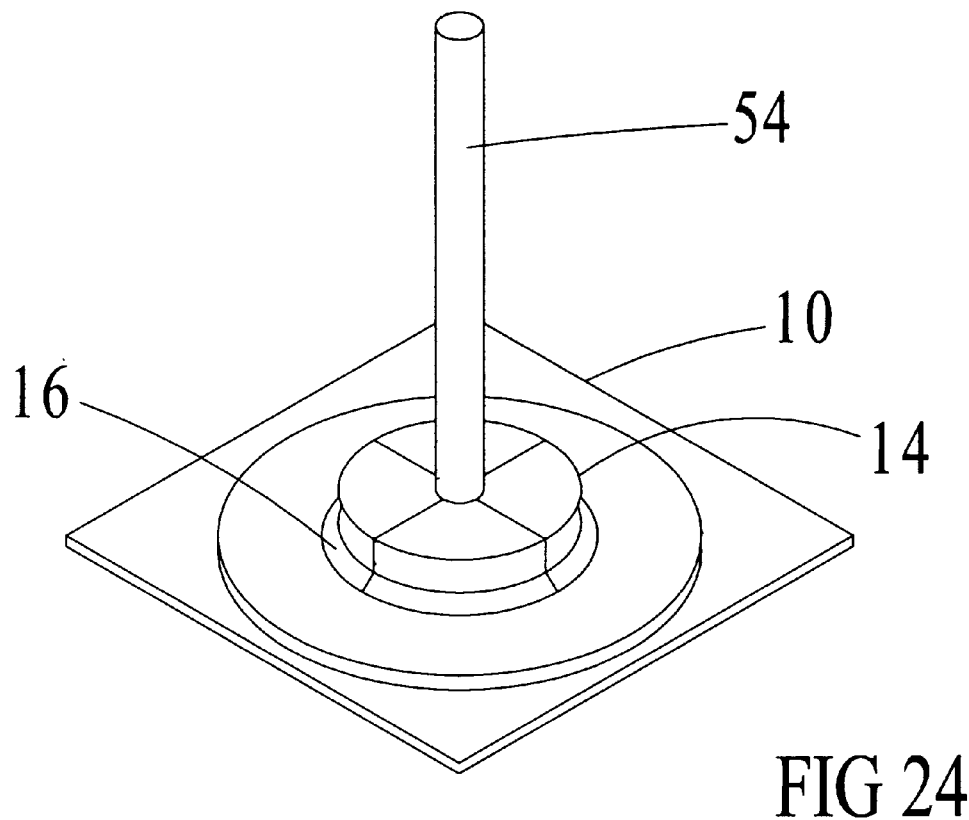
FIG. 24 is a perspective view of the top of the cover of a modified form of the present invention illustrating a handle attached to upper surface of the cover for application of external force in operation of the invention.

FIG. 23 illustrates an alternate embodiment of the cover 10 of the present invention wherein a continuous contact 52 is formed upon or attached to the bottom surface of cover 10 and encircled within return ridge 16. The surface of continuous contact 52 is either conductive or resistive; and continuous contact 52 is preferably formed of an elastic material that may be deformed when a force is applied FIG. 24 illustrates an alternate embodiment of cover 10 of the present invention wherein a handle 54 is attached or formed upon pad 14 of cover 10 for application of an external force by an operator in use of the present invention.

Although the detailed description of the drawings is directed toward illustrating the above described embodiments, the present invention is not limited to such embodiments, as variations and modifications may be made without departing from the scope of the present invention as claimed herein.

What is claimed is:

1. A multi-speed multi-direction analog pointing device comprising:
   an upper contact having a central axis, and a surface disposed around said central axis which is conductive;
   a substrate having an electrically conductive surface positioned below said upper contact and a dome switch on its surface situated below said upper contact and upon said central axis, for changing continuity of an electrical circuit, which is actuated by a downward force compressing said upper contact toward said substrate, and which provides tactile feedback transmitted through said upper contact upon the change in continuity of the electrical circuit; and
   displacement means for changing the orientation of the upper contact in relation to said conductive surface of said substrate and allowing compression of said upper contact toward said substrate, said displacement means having an undeflected position which is variably deflected when an external force is applied to activate the dome switch by external force along the central axis of the upper contact and to provide electrical contact between the upper contact and said electrically conductive surface of said substrate at a position on said upper contact and said electrically conductive surface of said substrate which corresponds to the direction and intensity of the external force tangent to the central axis of the upper contact, as a result, one or more signals, corresponding to the direction and intensity of the external force are provided.

2. The multi-speed multi-direction analog pointing device according to claim 1, wherein said displacement means comprises a dimple fashioned upon the upper surface of the upper contact to accommodate a finger tip of an operator for application of said external force.

3. The multi-speed multi-direction analog pointing device according to claim 2, further comprising a plurality of ridges fashioned within said dimple thereby reducing slippage between said dimple and said finger tip in application of said external force.

4. The multi-speed multi-direction analog pointing device according to claim 1, further comprising dome switch retaining means, wherein said dome switch retaining means is comprised of a plurality of dome switch retaining ridges formed on the upper surface of the substrate immediately surrounding the dome switch and extending upward around the dome switch toward the upper contact thereby securing said dome switch in position on the substrate when the upper contact is in its assembled position.

5. The multi-speed multi-direction analog pointing device according to claim 1, further comprising dome switch retaining means, wherein said dome switch retaining means is comprised of a plurality of dome switch retaining protrusions attached to the upper contact and extending downward immediately surrounding said dome switch, said retaining protrusions are engaged within dome switch retaining apertures formed through the surface of said substrate, thereby securing said dome switch in position on said substrate.

6. The multi-speed multi-direction analog pointing device according to claim 5 wherein said plurality of dome switch protrusions are formed of elastic material with shoulders to engage said surface of said substrate surrounding said dome switch retaining apertures, thereby suspending said upper contact above and out of contact with said electrically conductive surface of said substrate in the absence of external force.

7. The multi-speed multi-direction analog pointing device according to claim 1, wherein said upper contact is formed of elastic material.

8. The multi-speed multi-direction analog pointing device according to claim 1, wherein said surface of said upper contact disposed around said central axis is resistive.

9. The multi-speed multi-direction analog pointing device according to claim 8, further comprising dome switch retaining means, wherein said dome switch retaining means is comprised of a plurality of dome switch retaining ridges formed on the upper surface of the substrate immediately surrounding the dome switch and extending upward around the dome switch toward the upper contact thereby securing said dome switch in position on the substrate when the upper contact is in its assembled position.

10. The multi-speed multi-direction analog pointing device according to claim 8, further comprising dome switch retaining means, wherein said dome switch retaining means is comprised of a plurality of dome switch retaining protrusions attached to the upper contact and extending downward immediately surrounding said dome switch, said retaining protrusions are engaged within dome switch retaining apertures formed through the surface of said substrate, thereby securing said dome switch in position on said substrate.

11. The multi-speed multi-direction analog pointing device according to claim 10 wherein said plurality of dome switch protrusions are formed of elastic material with shoulders to engage said surface of said substrate surrounding said dome switch retaining apertures, thereby suspending said upper contact above and out of contact with said electrically conductive surface of said substrate in the absence of external force.

12. The multi-speed multi-direction analog pointing device according to claim 8, wherein said upper contact is formed of elastic material.

13. A multi-speed multi-direction analog pointing device comprising:
   an upper member having a central axis, and an activation surface disposed around said central axis;
   a two layered membrane switch positioned below said activation surface of said upper member having an electrically conductive surface on a first layer which faces an electrically conductive surface on a second layer;
   a dome switch situated between said two layer membrane switch and said upper contact upon said central axis, for changing continuity of an electrical circuit, said dome switch is actuated by a downward force compressing said upper member toward said two layer membrane switch, and said dome switch provides tactile feedback transmitted through said upper contact upon the change in continuity of the electrical circuit; and
   displacement means for changing the orientation of the upper member in relation to said two layered membrane switch, said displacement means having an undeflected position which is variably deflected when an external force is applied to provide contact between said activation surface of said upper member and said two layered membrane switch deforming said two layered membrane switch and causing electrical contact between said surface on said first layer and said surface on said second layer in at least one location corresponding to the direction and intensity of external force tangent to the central axis of the upper member, as a result, one or more signals, corresponding to the direction and intensity of the external force are provided.

14. The multi-speed multi-direction analog pointing device according to claim 13, wherein said displacement means comprises a dimple fashioned upon the upper surface of the upper contact to accommodate a finger tip of an operator for application of said external force.

15. The multi-speed multi-direction analog pointing device according to claim 14, further comprising a plurality of ridges fashioned within said dimple thereby reducing slippage between said dimple and said finger tip in application of said external force.

16. The multi-speed multi-direction analog pointing device according to claim 13, further comprising dome switch retaining means, wherein said dome switch retaining means is comprised of a plurality of dome switch retaining ridges formed on said two layered membrane switch immediately surrounding said dome switch and extending upward around said dome switch toward said upper member thereby securing said dome switch in position on said central axis when said upper contact is in its assembled position.

17. The multi-speed multi-direction analog pointing device according to claim 13, further comprising dome switch retaining means, wherein said dome switch retaining means is comprised of a plurality of dome switch retaining protrusions attached to said upper member and extending downward immediately surrounding said dome switch, said retaining protrusions are engaged within dome switch retaining apertures formed through the surface of said two layered membrane switch, thereby securing said dome switch in position on said central axis.

18. The multi-speed multi-direction analog pointing device according to claim 17 wherein said plurality of dome switch protrusions are formed of elastic material with shoulders to engage said surface of said two layered membrane switch surrounding said dome switch retaining apertures, thereby suspending said upper member above and out of contact with said two layered membrane switch in the absence of external force.

19. The multi-speed multi-direction analog pointing device according to claim 13, wherein said upper member is formed of elastic material.

20. A multi-speed multi-direction analog pointing device comprising:
   an upper contact having a central axis, a multiple number of ribs which radiate out from said central axis at different angles, and an electrically conductive surface formed on the bottom of said ribs;
   a substrate having an upper surface positioned below said upper contact with a plurality of electrical contact points which are situated below and aligned with said electrically conductive surface formed on the bottom of said ribs; and
   displacement means for tilting and downwardly moving said upper contact, said displacement means having an undeflected position which is variably deflected when an external force is applied to provide electrical contact between said electrically conductive surface formed on the bottom of said ribs and at least one of said electrical contact points corresponding to the direction of the external force with the overall area of electrical contact made between said electrically conductive surface formed at the bottom of said ribs and said electrical contact points corresponding to the intensity of the external force, as a result, one or more signals of measurable resistance adapted to be interpreted into speed and directional vectors is produced by the completion of one or more paths of continuity between said electrically conductive surface formed at the bottom of said ribs and said electrical contact points.

21. The multi-speed multi-direction analog pointing device according to claim 20, further comprising a short protection protrusion formed on the bottom of said ribs and extends downward toward said substrate upon said central axis, said short protection protrusion being elastic whereby said short protection protrusion prevents contact between said conductive surface of said upper contact and said substrate in the absence of an external force and may be deformed in the presence of an external force allowing contact to be made between said conductive surface of said upper contact and said substrate.

22. The multi-speed multi-direction analog pointing device according to claim 20, wherein said displacement means comprises a dimple fashioned upon the upper surface of the upper contact to accommodate a finger tip of an operator for application of said external force.

23. The multi-speed multi-direction analog pointing device according to claim 22, further comprising a plurality of ridges fashioned within said dimple thereby reducing slippage between said dimple and said finger tip in application of said external force.

24. The multi-speed multi-direction analog pointing device according to claim 20, wherein said plurality of electrical contact points on said upper surface of said substrate is comprised of continuous strips of resistive material situated below and aligned with said ribs of said upper contact.

25. The multi-speed multi-direction analog pointing device according to claim 20, further comprising a dome switch situated upon said upper surface of said substrate and positioned below said upper contact upon said central axis, which may be actuated by a downward force compressing said upper contact toward said substrate thereby allowing a selection to be made.

26. The multi-speed multi-direction analog pointing device according to claim 25, further comprising dome switch retaining means, wherein said dome switch retaining means is comprised of a plurality of dome switch retaining ridges formed on said upper surface of said substrate immediately surrounding said dome switch and extending upward around said dome switch toward said upper contact thereby securing said dome switch in position on said substrate when said upper contact is in its assembled position.

27. The multi-speed multi-direction analog pointing device according to claim 25, further comprising dome switch retaining means, wherein said dome switch retaining means is comprised of a plurality of dome switch retaining protrusions attached to said upper contact and extending downward immediately surrounding said dome switch, said retaining protrusions are engaged within dome switch retaining apertures formed through the surface of said substrate, thereby securing said dome switch in position on said substrate.

28. The multi-speed multi-direction analog pointing device according to claim 27 wherein said plurality of dome switch protrusions are formed of elastic material with shoulders to engage said surface of said substrate surrounding said dome switch retaining apertures, thereby suspending said upper contact above and out of contact with said electrically conductive surface of said substrate in the absence of external force.

29. A multi-speed multi-direction analog pointing device comprising:
an upper contact having a central axis, a multiple number of ribs which radiate out from said central axis at different angles, and an electrically conductive surface formed on the bottom of said ribs;
a substrate having an upper surface positioned below said upper contact with a first plurality of electrical contact points and a second plurality of electrical contact points which are situated below and aligned with said electrically conductive surface formed on the bottom of said ribs; and
displacement means for tilting and downwardly moving said upper contact, said displacement means having an undeflected position which is variably deflected when an external force is applied to provide electrical contact simultaneously between said electrically conductive surface formed on the bottom of said ribs and at least one of said first electrical contact points and at least one of said second electrical contact points corresponding to the direction of the external force with the overall area of electrical contact made between said electrically conductive surface formed at the bottom of said ribs and said first electrical contact points and said second electrical contact points corresponding to the intensity of the external force, as a result, one or more signals of measurable resistance adapted to be interpreted into speed and directional vectors is produced by the electrically conductive surface formed at the bottom of said ribs completing one or more paths of continuity between said first electrical contact points and said second electrical contact points.

30. The multi-speed multi-direction analog pointing device according to claim 29, further comprising a short protection protrusion formed on the bottom of said ribs and extends downward toward said substrate upon said central axis, said short protection protrusion being elastic whereby said short protection protrusion prevents contact between said conductive surface of said upper contact and said substrate in the absence of an external force and may be deformed in the presence of an external force allowing contact to be made between said conductive surface of said upper contact and said substrate.

31. The multi-speed multi-direction analog pointing device according to claim 29, wherein said displacement means comprises a dimple fashioned upon the upper surface of the upper contact to accommodate a finger tip of an operator for application of said external force.

32. The multi-speed multi-direction analog pointing device according to claim 31, further comprising a plurality of ridges fashioned within said dimple thereby reducing slippage between said dimple and said finger tip in application of said external force.

33. The multi-speed multi-direction analog pointing device according to claim 29, where in said first plurality of electrical contact points on said upper surface of said substrate is comprised of first continuous strips of conductive material and said second plurality of electrical contact points on said upper surface of said substrate is comprised of second continuous strips of resistive material, wherein each said first continuous strip of conductive material has a companion said second continuous strip of resistive material parallel to it wherein each said first continuous strip of conductive material and its companion said second continuous strip of resistive material are situated below and aligned with said bottom surface of said ribs of said upper contact.

34. The multi-speed multi-direction analog pointing device according to claim 33, wherein said first continuous strips of conductive material are comprised of continuous strips of resistive material.

35. The multi-speed multi-direction analog pointing device according to claim 29, further comprising a dome switch situated upon said upper surface of said substrate and positioned below said upper contact upon said central axis, which may be actuated by a downward force compressing said upper contact toward said substrate thereby allowing a selection to be made.

36. The multi-speed multi-direction analog pointing device according to claim 35, further comprising dome switch retaining means, wherein said dome switch retaining means is comprised of a plurality of dome switch retaining ridges formed on said upper surface of said substrate immediately surrounding said dome switch and extending upward around said dome switch toward said upper contact thereby securing said dome switch in position on said substrate when said upper contact is in its assembled position.

37. The multi-speed multi-direction analog pointing device according to claim 35, further comprising dome switch retaining means, wherein said dome switch retaining means is comprised of a plurality of dome switch retaining protrusions attached to said upper contact and extending downward immediately surrounding said dome switch, said retaining protrusions are engaged within dome switch retaining apertures formed through the surface of said substrate, thereby securing said dome switch in position on said substrate.

38. The multi-speed multi-direction analog pointing device according to claim 37, wherein said plurality of dome switch protrusions are formed of elastic material with shoulders to engage said surface of said substrate surrounding said dome switch retaining apertures, thereby suspending said upper contact above and out of contact with said electrically conductive surface of said substrate in the absence of external force.

39. A multi-speed multi-direction analog pointing device comprising:
an upper member having a central axis, a multiple number of ribs which radiate out from said central axis at different angles, and an activation surface on the bottom of said ribs;
a two layered membrane switch having a plurality of electrical contact points on a first layer which face a corresponding plurality of electrical contact points on a second layer, said plurality of electrical contact points on said first layer and said corresponding plurality of electrical contact points on said second layer are positioned below and aligned with said activation surface on the bottom of said ribs; said two layered membrane switch has an undeformed position in which said plurality of electrical contact points on said first layer is separated from said corresponding plurality of electrical contact points on said second layer; and
displacement means for tilting and downwardly moving said upper member, said displacement means having an undeflected position which is variably deflected when an external force is applied to provide contact between said activation surface of said upper member and said two layered membrane switch, deforming said two layer membrane switch and causing at least one of said electrical contact points on said first layer to make contact with said corresponding electrical contact point on said second layer corresponding to the direction of the external force with the overall area of electrical contact made between said electrical contact points on said first layer and said corresponding electrical contact points on said second layer corresponding to the intensity of the external force, as a result, one or more signals of measurable resistance adapted to be interpreted into speed and directional vectors is produced by the completion of one or more paths of continuity between said electrical contact points on said first layer and said corresponding electrical contact points on said second layer.

40. The multi-speed multi-direction analog pointing device according to claim 39, wherein said displacement means comprises a dimple fashioned upon the upper surface of the upper member to accommodate a finger tip of an operator for application of said external force.

41. The multi-speed multi-direction analog pointing device according to claim 40, further comprising a plurality of ridges fashioned within said dimple thereby reducing slippage between said dimple and said finger tip in application of said external force.

42. The multi-speed multi-direction analog pointing device according to claim 39, wherein said plurality of electrical contact points on said first layer is comprised of continuous strips of conductive material situated below and aligned with said bottom surface of said ribs of said upper member, and wherein said corresponding plurality of electrical contact points on said second layer is comprised of continuous strips of resistive material facing said continuous strips of conductive material on said first layer and situated below and aligned with said bottom surface of said ribs of said upper member.

43. The multi-speed multi-direction analog pointing device according to claim 42, wherein said plurality of electrical contact points on said first layer is comprised of continuous strips of resistive material.

44. The multi-speed multi-direction analog pointing device according to claim 39, further comprising a dome switch situated between said two layered membrane switch and said activation surface of said upper member upon said central axis, which may be actuated by a downward force compressing said upper member toward said two layered membrane switch thereby allowing a selection to be made.

45. The multi-speed multi-direction analog pointing device according to claim 44, further comprising dome switch retaining means, wherein said dome switch retaining means is comprised of a plurality of dome switch retaining ridges formed on said two layered membrane switch immediately surrounding said dome switch and extending upward around said dome switch toward said upper member thereby securing said dome switch in position on said central axis when said upper contact is in its assembled position.

46. The multi-speed multi-direction analog pointing device according to claim 44, further comprising dome switch retaining means, wherein said dome switch retaining means is comprised of a plurality of dome switch retaining protrusions attached to said upper member and extending downward immediately surrounding said dome switch, said retaining protrusions are engaged within dome switch retaining apertures formed through the surface of said two layered membrane switch, thereby securing said dome switch in position on said central axis.

47. The multi-speed multi-direction analog pointing device according to claim 46 wherein said plurality of dome switch protrusions are formed of elastic material with shoulders to engage said surface of said two layered membrane switch surrounding said dome switch retaining apertures, thereby suspending said upper member above and out of contact with said two layered membrane switch in the absence of external force.

48. A multi-speed multi-direction analog pointing device comprising:
an upper contact having a central axis, a multiple number of ribs which radiate out from said central axis at different angles, and an electrically conductive surface formed on the bottom of said ribs;
a substrate having an upper surface positioned below said upper contact with a plurality of electrical contact points which are situated below and aligned with said electrically conductive surface formed on the bottom of said ribs; and
displacement means for tilting and downwardly moving said upper contact, said displacement means having an undeflected position which is variably deflected when an external force is applied to provide electrical contact between said electrically conductive surface formed on the bottom of said ribs and at least one of said electrical contact points corresponding to the direction of the external force with the distance from the central axis where said electrical contact is made between said electrical conductive surface formed on the bottom of said ribs and said electrical contact points corresponding to the intensity of said external force, as a result, one or more signals of measurable resistance adapted to be interpreted into speed and directional vectors is produced by the completion of one or more paths of continuity between said electrically conductive surface formed at the bottom of said ribs and said electrical contact points.

49. The multi-speed multi-direction analog pointing device according to claim 48, further comprising a short protection protrusion formed on the bottom of said ribs and extends downward toward said substrate upon said central axis, said short protection protrusion being elastic whereby said short protection protrusion prevents contact between said conductive surface of said upper contact and said substrate in the absence of an external force and may be deformed in the presence of an external force allowing contact to be made between said conductive surface of said upper contact and said substrate.

50. The multi-speed multi-direction analog pointing device according to claim 48, wherein said displacement means comprises a dimple fashioned upon the upper surface of the upper contact to accommodate a finger tip of an operator for application of said external force.

51. The multi-speed multi-direction analog pointing device according to claim 50, further comprising a plurality of ridges fashioned within said dimple thereby reducing slippage between said dimple and said finger tip in application of said external force.

52. The multi-speed multi-direction analog pointing device according to claim 48, further comprising a dome switch situated upon said upper surface of said substrate and positioned below said upper contact upon said central axis, which may be actuated by a downward force compressing said upper contact toward said substrate thereby allowing a selection to be made.

53. The multi-speed multi-direction analog pointing device according to claim 52, further comprising dome switch retaining means, wherein said dome switch retaining means is comprised of a plurality of dome switch retaining ridges formed on said upper surface of said substrate immediately surrounding said dome switch and extending upward around said dome switch toward said upper contact thereby securing said dome switch in position on said substrate when said upper contact is in its assembled position.

54. The multi-speed multi-direction analog pointing device according to claim 52, further comprising dome switch retaining means, wherein said dome switch retaining means is comprised of a plurality of dome switch retaining protrusions attached to said upper contact and extending downward immediately surrounding said dome switch, said retaining protrusions are engaged within dome switch retaining apertures formed through the surface of said substrate, thereby securing said dome switch in position on said substrate.

55. The multi-speed multi-direction analog pointing device according to claim 54 wherein said plurality of dome switch protrusions are formed of elastic material with shoulders to engage said surface of said substrate surrounding said dome switch retaining apertures, thereby suspending said upper contact above and out of contact with said electrically conductive surface of said substrate in the absence of external force.

56. A multi-speed multi-direction analog pointing device comprising:

an upper contact having a central axis, a multiple number of ribs which radiate out from said central axis at different angles, and an electrically conductive surface formed on the bottom of said ribs;

a substrate having an upper surface positioned below said upper contact with a first plurality of electrical contact points and a second plurality of electrical contact points which are situated below and aligned with said electrically conductive surface formed on the bottom of said ribs; and displacement means for tilting and downwardly moving said upper contact, said displacement means having an undeflected position which is variably deflected when an external force is applied to provide electrical contact simultaneously between said electrically conductive surface formed on the bottom of said ribs and at least one of said first electrical contact points and at least one of said second electrical contact points in at least one direction from the central axis corresponding to the direction of the external force with the distance from the central axis where said electrical contact is made between said electrically conductive surface formed at the bottom of said ribs and said first electrical contact points and said second electrical contact points corresponding to the intensity of the external force, as a result, one or more signals of measurable resistance adapted to be interpreted into speed and directional vectors is produced by the electrically conductive surface formed at the bottom of said ribs completing one or more paths of continuity between said first electrical contact points and said second electrical contact points.

57. The multi-speed multi-direction analog pointing device according to claim 56, further comprising a short protection protrusion formed on the bottom of said ribs and extends downward toward said substrate upon said central axis, said short protection protrusion being elastic whereby said short protection protrusion prevents contact between said conductive surface of said upper contact and said substrate in the absence of an external force and may be deformed in the presence of an external force allowing contact to be made between said conductive surface of said upper contact and said substrate.

58. The multi-speed multi-direction analog pointing device according to claim 56, wherein said displacement means comprises a dimple fashioned upon the upper surface of the upper contact to accommodate a finger tip of an operator for application of said external force.

59. The multi-speed multi-direction analog pointing device according to claim 58, further comprising a plurality of ridges fashioned within said dimple thereby reducing slippage between said dimple and said finger tip in application of said external force.

60. The multi-speed multi-direction analog pointing device according to claim 56, further comprising a dome switch situated upon said upper surface of said substrate and positioned below said upper contact upon said central axis, which may be actuated by a downward force compressing said upper contact toward said substrate thereby allowing a selection to be made.

61. The multi-speed multi-direction analog pointing device according to claim 60, further comprising dome switch retaining means, wherein said dome switch retaining means is comprised of a plurality of dome switch retaining ridges formed on said upper surface of said substrate immediately surrounding said dome switch and extending upward around said dome switch toward said upper contact thereby securing said dome switch in position on said substrate when said upper contact is in its assembled position.

62. The multi-speed multi-direction analog pointing device according to claim 60, further comprising dome switch retaining means, wherein said dome switch retaining means is comprised of a plurality of dome switch retaining protrusions attached to said upper contact and extending downward immediately surrounding said dome switch, said retaining protrusions are engaged within dome switch retaining apertures formed through the surface of said substrate, thereby securing said dome switch in position on said substrate.

63. The multi-speed multi-direction analog pointing device according to claim 62 wherein said plurality of dome switch protrusions are formed of elastic material with shoulders to engage said surface of said substrate surrounding said dome switch retaining apertures, thereby suspending said upper contact above and out of contact with said electrically conductive surface of said substrate in the absence of external force.

64. A multi-speed multi-direction analog pointing device comprising:
an upper member having a central axis, a multiple number of ribs which radiate out from said central axis at different angles, and an activation surface on the bottom of said ribs;
a two layered membrane switch having a plurality of electrical contact points on a first layer which face a corresponding plurality of electrical contact points on a second layer, said plurality of electrical contact points on said first layer and said corresponding plurality of electrical contact points on said second layer are positioned below and aligned with said activation surface on the bottom of said ribs; said two layered membrane switch has an undeformed position in which said plurality of electrical contact points on said first layer is separated from said corresponding plurality of electrical contact points on said second layer; and
displacement means for tilting and downwardly moving said upper member, said displacement means having an undeflected position which is variably deflected when an external force is applied to provide contact between said activation surface of said upper member and said two layered membrane switch, deforming said two layer membrane switch and causing at least one of said electrical contact points on said first layer to make contact with said corresponding electrical contact point on said second layer in at least one direction from the central axis corresponding to the direction of the external force with the distance from the central axis where said contact is made between said contact points on said first layer and said contact points on said second layer corresponding to the intensity of the external force, as a result, one or more signals of measurable resistance adapted to be interpreted into speed and directional vectors is produced by the completion of one or more paths of continuity between said electrical contact points on said first layer and said corresponding electrical contact points on said second layer.

65. The multi-speed multi-direction analog pointing device according to claim 64, wherein said displacement means comprises a dimple fashioned upon the upper surface of the upper member to accommodate a finger tip of an operator for application of said external force.

66. The multi-speed multi-direction analog pointing device according to claim 65, further comprising a plurality of ridges fashioned within said dimple thereby reducing slippage between said dimple and said finger tip in application of said external force.

67. The multi-speed multi-direction analog pointing device according to claim 64, further comprising a dome switch situated between said two layered membrane switch and said activation surface of said upper member upon said central axis, which may be actuated by a downward force compressing said upper member toward said two layered membrane switch thereby allowing a selection to be made.

68. The multi-speed multi-direction analog pointing device according to claim 67, further comprising dome switch retaining means, wherein said dome switch retaining means is comprised of a plurality of dome switch retaining ridges formed on said two layered membrane switch immediately surrounding said dome switch and extending upward around said dome switch toward said upper member thereby securing said dome switch in position on said central axis when said upper contact is in its assembled position.

69. The multi-speed multi-direction analog pointing device according to claim 67, further comprising dome switch retaining means, wherein said dome switch retaining means is comprised of a plurality of dome switch retaining protrusions attached to said upper member and extending downward immediately surrounding said dome switch, said retaining protrusions are engaged within dome switch retaining apertures formed through the surface of said two layered membrane switch, thereby securing said dome switch in position on said central axis.

70. The multi-speed multi-direction analog pointing device according to claim 69 wherein said plurality of dome switch protrusions are formed of elastic material with shoulders to engage said surface of said two layered membrane switch surrounding said dome switch retaining apertures, thereby suspending said upper member above and out of contact with said two layered membrane switch in the absence of external force.

* * * * *